US009218149B2

(12) United States Patent
Mori

(10) Patent No.: US 9,218,149 B2
(45) Date of Patent: Dec. 22, 2015

(54) OUTPUT SYSTEM, TERMINAL APPARATUS, AND METHOD OF OUTPUTTING DATA

(71) Applicant: Shinya Mori, Tokyo (JP)

(72) Inventor: Shinya Mori, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/471,249

(22) Filed: Aug. 28, 2014

(65) Prior Publication Data

US 2015/0077793 A1 Mar. 19, 2015

(30) Foreign Application Priority Data

Sep. 13, 2013 (JP) ................................. 2013-191119

(51) Int. Cl.
*G06F 3/12* (2006.01)

(52) U.S. Cl.
CPC ............ *G06F 3/1268* (2013.01); *G06F 3/1204* (2013.01); *G06F 3/126* (2013.01); *G06F 3/1267* (2013.01); *G06F 3/1285* (2013.01); *G06F 3/1288* (2013.01)

(58) Field of Classification Search
USPC ........................................................ 358/1.15
See application file for complete search history.

(56) References Cited

U.S. PATENT DOCUMENTS

| 8,472,041 | B2 | 6/2013 | Hakozaki |
| 2007/0146778 | A1 | 6/2007 | Kitagata et al. |
| 2008/0030750 | A1* | 2/2008 | Kato ............................... 358/1.4 |
| 2013/0198211 | A1* | 8/2013 | Kohkaki et al. ............... 707/756 |
| 2013/0301080 | A1* | 11/2013 | Nakata .......................... 358/1.15 |
| 2014/0189170 | A1 | 7/2014 | Takigawa |

FOREIGN PATENT DOCUMENTS

| JP | 2007-200284 | 8/2007 |
| JP | 2010-277524 | 12/2010 |
| JP | 2014-127125 | 7/2014 |
| JP | 2014-127126 | 7/2014 |
| WO | 2014/103975 | 7/2014 |

* cited by examiner

*Primary Examiner* — Ngon Nguyen
(74) *Attorney, Agent, or Firm* — IPUSA, PLLC

(57) ABSTRACT

An output system includes a selection receipt unit that displays a function selection screen enabling a user to select a function based on an output request of data to be output received from the user and causes the user to select the function; a determination unit that determines, in response to the function selected by the user, an accumulation method and an accumulation destination of output data converted from the data to be output; an accumulation control unit that sends the output data converted from the data to be output based on the determined accumulation method of the output data and the output request to the determined accumulation destination and causes the determined accumulation destination to store the output data and the output request; and an output control unit that acquires the output data and the output request from the accumulation destination and outputs the output data.

18 Claims, 17 Drawing Sheets

FIG.7

| JOB ID | JOB NAME | ACCUMULATION DESTINATION | FORMAT TYPE | USER ID | PROXY USER ID |
|---|---|---|---|---|---|
| 1 | 1.txt-MEMO PAD | Client01 | XPS | 1 | |
| 2 | 2.doc-○○○2010 | Server01 | PCL | 1 | 11, 12 |
| 3 | 3.xls-×××2010 | Client02 | PCL | 2 | |
| 4 | 4.txt-MEMO PAD | Server01 | XPS | 11 | |
| ⋮ | ⋮ | ⋮ | ⋮ | ⋮ | ⋮ |

FIG.8

| USER ID | PROXY USER ID |
|---|---|
| 1 | 11, 12 |
| 3 | 8 |
| 7 | 8, 9 |
| ⋮ | ⋮ |

FIG.17

SETUP FOR PRINT JOB ACCUMULATION — 1040

ACCUMULATION DESTINATION ◉ PRINT SERVER
○ CLIENT TERMINAL

PROXY PRINT ◉ PERFORM PROXY PRINT
○ NOT PERFORM PROXY PRINT

ACCUMULATION METHOD ◉ NORMAL
○ PRIORITY ON SPEED (FUNCTION IS PARTLY LIMITED)

☒ SELECT AT EACH PRINT

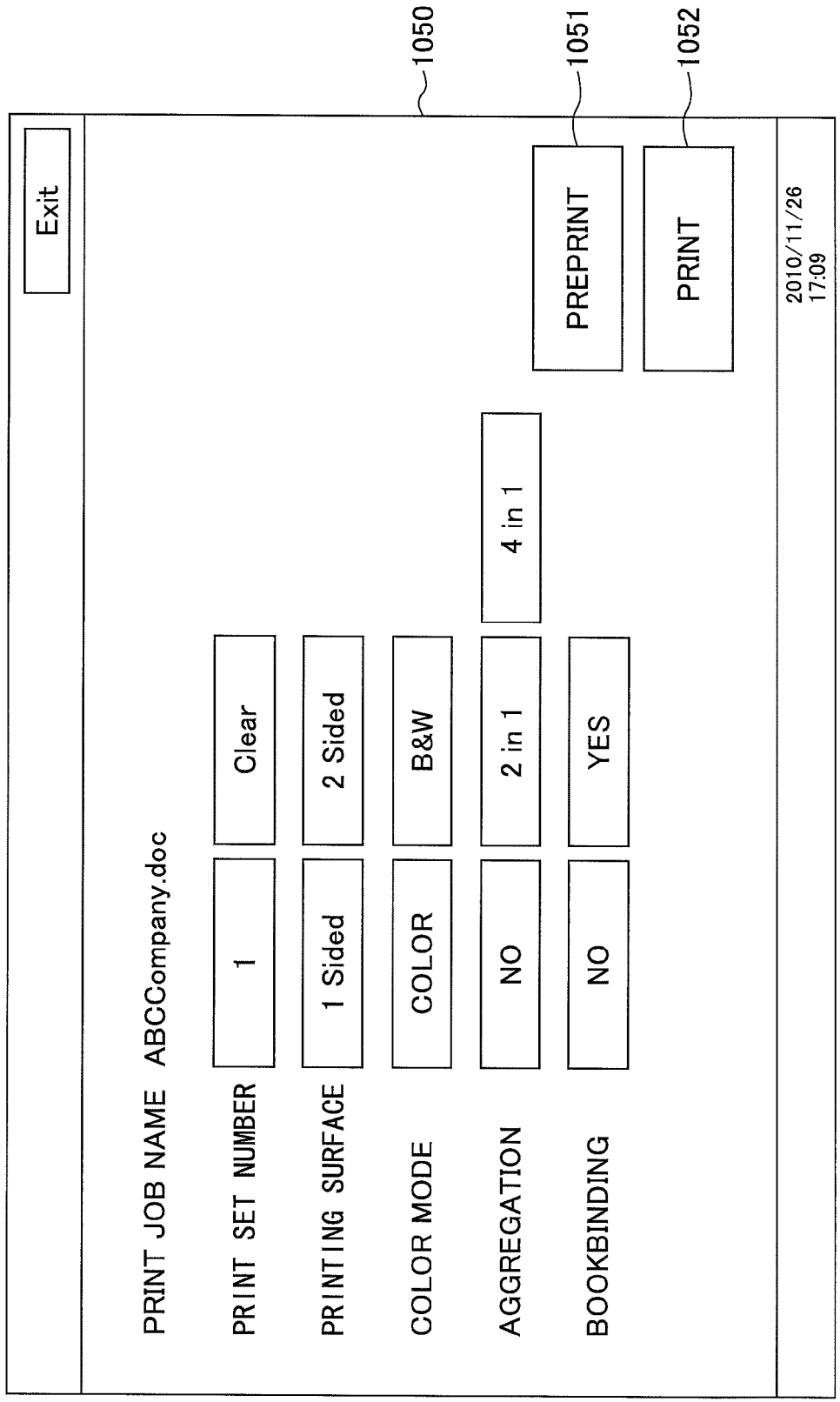

OUTPUT SYSTEM, TERMINAL APPARATUS, AND METHOD OF OUTPUTTING DATA

BACKGROUND OF THE INVENTION

1. Field of the Invention

The present invention relates to an output system, a terminal apparatus, a program, and a method of outputting data.

2. Description of the Related Art

A so-called pull print system where a print object data is designated from a printer, a designated print object data or a print job based on a print job object data is taken inside the printer through a communication line, and a print output is performed, is disclosed in Japanese Laid-open Patent Publication No. 2007-200284.

In this pull print system, there is a case where a user selects a printer driver from an application program and requests a print to thereby accumulate the print job in an accumulation destination. The accumulation destination of the print job is determined by an accumulation setup of, for example, a printer driver. Therefore, in a case where an accumulation setup is desired to be changed for each print in the pull print system, there is a problem in that excessive time and effort are required for a user to change the accumulation setup of a printer driver in consideration of the content of the print or the like.

However, such a problem is not limited to a print system such as a pull print system or the like, and exists in an output system where the user outputs a job accumulated in the accumulation destination from an output apparatus such as a projector, a monitor, or the like in a manner similar to this print system.

SUMMARY OF THE INVENTION

It is a general object of at least one embodiment of the present invention to provide an output system that substantially obviates one or more problems caused by the limitations and disadvantages of the related art.

Accordingly, embodiments of the present invention provide a novel and useful output system, a terminal apparatus, a program, and a method of outputting data solving one or more of the problems discussed above.

One aspect of the embodiments of the present invention may be to provide an output system including a terminal apparatus, an output apparatus, at least one information processing apparatus, and a network for connecting the terminal apparatus, the output apparatus, the at least one information processing apparatus, the output system further including a selection receipt unit that displays a function selection screen enabling a user to select a function based on an output request of data to be output received from the user and causes the user to select the function; a determination unit that determines, in response to the function selected by the user, an accumulation method and an accumulation destination of output data converted from the data to be output; an accumulation control unit that sends the output data converted from the data to be output based on the determined accumulation method of the output data and the output request to the determined accumulation destination and causes the determined accumulation destination to store the output data and the output request; and an output control unit that acquires, when the output apparatus requests to acquire the output data and the output request, the output data and the output request from the accumulation destination and outputs the output data to the output apparatus.

Additional objects and advantages of the embodiments will be set forth in part in the description which follows, and in part will be clear from the description, or may be learned by practice of the invention. Objects and advantages of the invention will be realized and attained by means of the elements and combinations particularly pointed out in the appended claims.

It is to be understood that both the foregoing general description and the following detailed description are exemplary and explanatory only and are not restrictive of the invention as claimed.

BRIEF DESCRIPTION OF THE DRAWINGS

FIG. 4 is an exemplary processing block chart of a print flow plug-in;

FIG. 5 is an exemplary processing block chart of a job accumulation plug-in;

FIG. 6 is an exemplary processing block chart of a proxy print plug-in;

FIG. 7 is an exemplary structural view of print job information;

FIG. 8 is an exemplary structural view of proxy user information;

FIG. 17 illustrates another exemplary image of a function selection screen;

FIG. 20 illustrates another exemplary image of the print setup change screen.

DETAILED DESCRIPTION OF THE PREFERRED EMBODIMENTS

A description is given below, with reference to the FIG. 1 through FIG. 20 of embodiments of the present invention. Where the same reference symbols are attached to the same parts, repeated description of the parts is omitted.

Reference symbols typically designate as follows:

1: print system;
11: administrator terminal;
12: application server;
13: authentication server;

14: print server;
15, 17: output apparatus;
16: client terminal;
21: document production application;
22: virtual printer driver;
23: real printer driver;
24: plug-in;
25: platform API;
26: platform;
27: storage part;
31: print flow plug-in;
32: job accumulation plug-in;
33: proxy print plug-in;
41: display control part (UI control part);
42: setup part;
43: communication part;
51: print flow control part;
52: function selection part;
53: display part;
54: print flow setup memory part;
61: print job accumulation part;
62: print job administration part;
63: server connection part;
64: print job information memory part;
65: print data memory part;
71: user information add part;
72: proxy user administration part;
73: server connection part;
74: proxy user information storage part;
100: computer system;
101: input device;
102: display apparatus;
103: external I/F;
103a: recording medium;
104: RAM;
105: ROM;
106: CPU;
107: communication I/F;
108: HDD;
1000: print setup screen;
1010, 1040: function selection screen;
1020: print job information list screen;
1030, 1050: print setup change screen;
B: bus; and
N1: network.

Within an embodiment, although a print system is described as an exemplary output system, the embodiment is not limited to the print system. The output system may be a projection system, a display system, or a system outputting a job accumulated in an accumulation destination.

First Embodiment

<System Structure>

Figure 1:
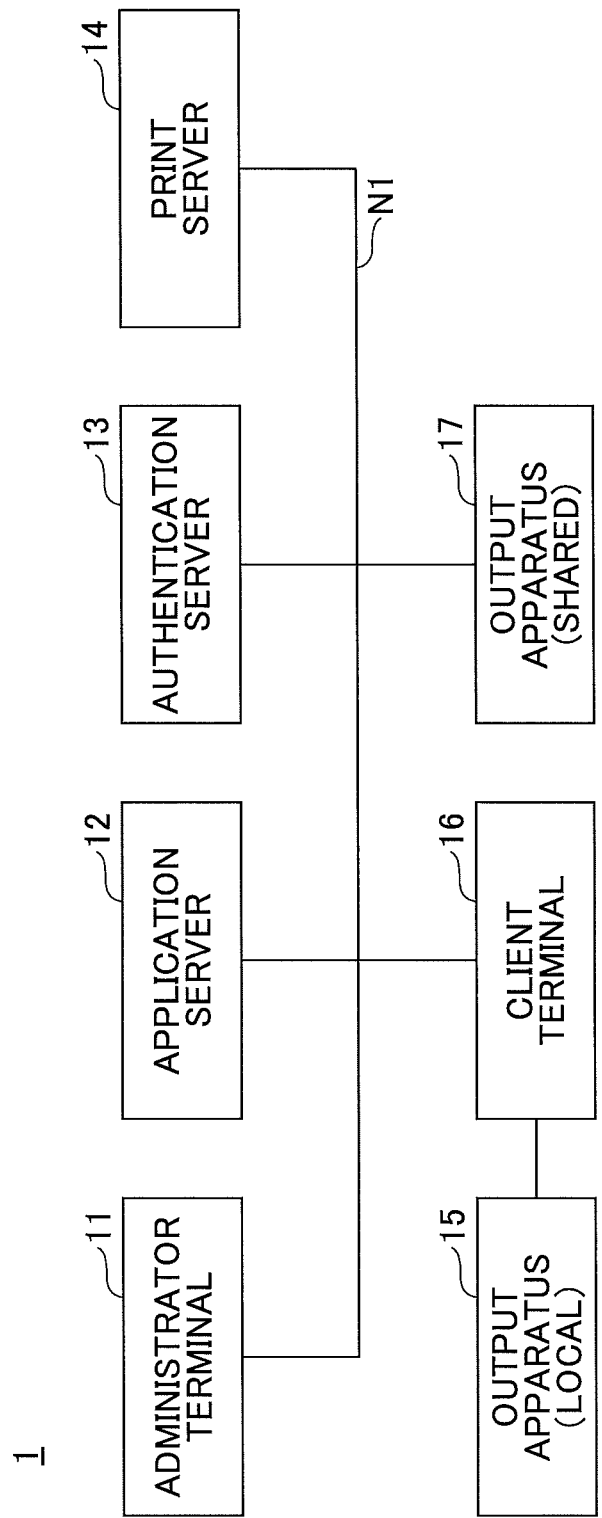
FIG. 1 illustrates an exemplary structure of a print system of an embodiment.

FIG. 1 illustrates an exemplary structure of a print system of a first embodiment. Referring to FIG. 1, the print system 1 includes an administrator terminal 11, an application server 12, an authentication server 13, a print server 14, a client terminal 16, and a shared output apparatus 17, which are mutually connected by a network N1 such as a LAN. Further, the print system 1 includes a local output apparatus 15 connected to the client terminal 16.

The administrator terminal 11, the application server 12, the authentication server 13, the print server 14, the local output apparatus 15, the client terminal 16, and the shared output apparatus 17 includes a wireless or wired communication unit 16.

Referring to FIG. 1, the number of each of the administrator terminal 11, the application server 12, the authentication server 13, the print server 14, the local output apparatus 15, the client terminal 16, and the shared output apparatus 17 is one. However, the number may be plural.

The administrator terminal 11 is an information processing apparatus (a computer system) that is used by an administrator such as a PC. The administrator terminal 11 can perform a setup of the client terminal 16 of each user upon request of the administrator.

The application server 12 is realized by at least one information processing apparatus. The application server 12 stores print setup data that is application software to be delivered to the client terminal 16 such as print application software or the like, setup data related to the application software, and so on. The application server 12 delivers the stored print application software or the stored print setup data to the client terminal 16.

The application server 13 is substantialized by at least one information processing apparatus. The authentication server 13 holds user information and performs authentication based on a request from the output apparatus 17 or the like. The print server 14 is substantialized by at least one information processing apparatus. The print server 14 holds print data or print job information. The print server 14 sends the print data or the print job information to the output apparatus 17 or the like based on a request from an output apparatus 17 or the like.

The output apparatus 15 is an image forming apparatus directly connected to the client terminal 16 by a wired or wireless communication such as a printer. The output apparatus 15 is an image forming apparatus such as a printer, a copier, a multifunction peripheral, or a laser printer, and may be a projection apparatus performing an output display such as a projector, a display apparatus performing an output display such as a display, an audio output apparatus outputting audio data, or the like.

The client terminal 16 is an information processing apparatus used by the user, such as a PC. The client terminal 16 is a terminal apparatus such as a smartphone, a mobile phone, and a PC. The output apparatus 17 is, for example, an image forming apparatus connected to the network N1 by the wired or wireless communication such as a printer. The output apparatus 17 is an image forming apparatus such as a printer, a copier, a multifunction peripheral, or a laser printer, and may be a projection apparatus performing an output display such as a projector, a display apparatus performing an output display such as a display, an audio output apparatus outputting audio data, or the like.

The print system illustrated in FIG. 1 is only an example, and may be structured to exclude the administrator terminal 11 and the application server 12.

<Hardware Structure>

Figure 2:
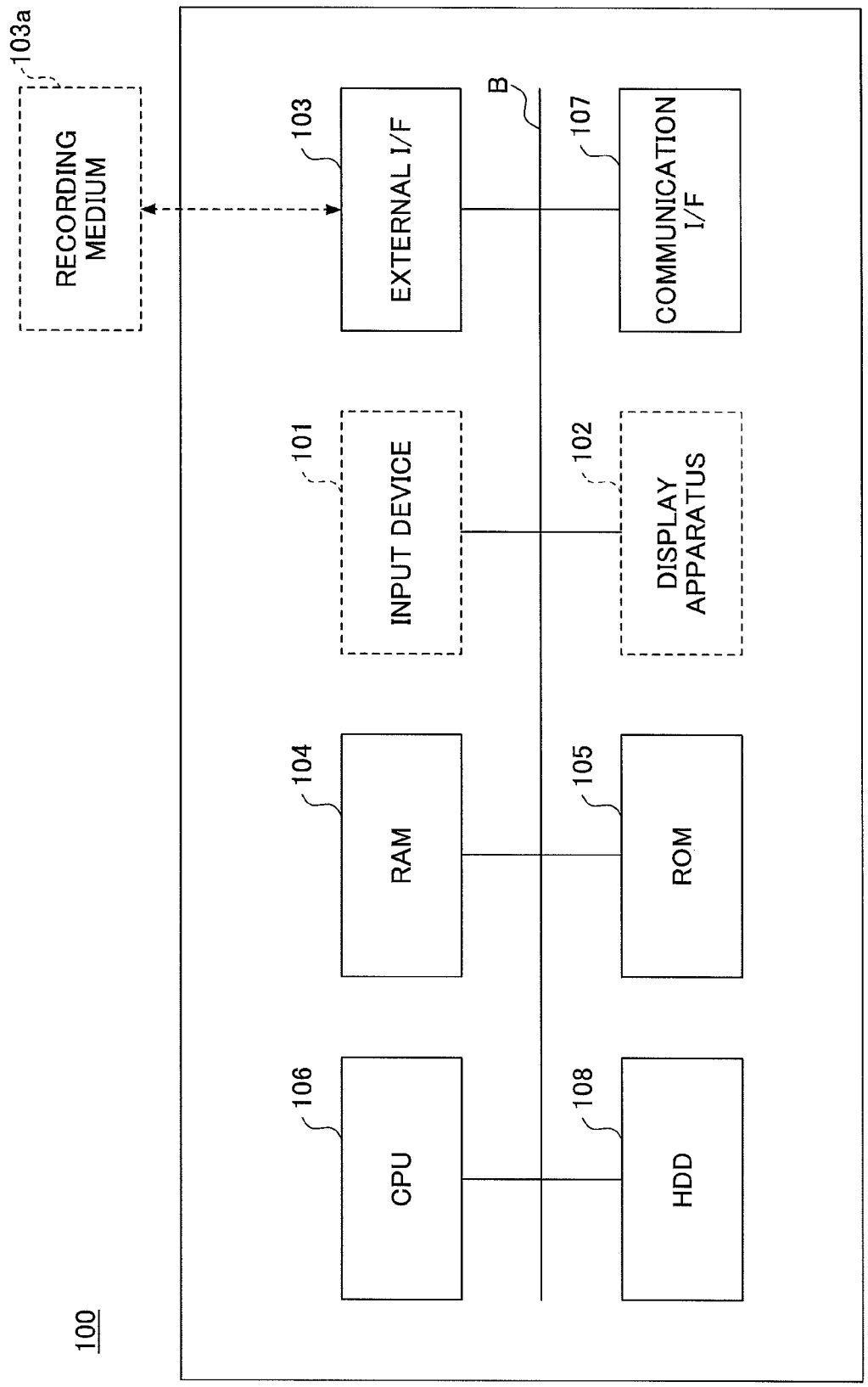
FIG. 2 illustrates an exemplary hardware structure of a computer system of the embodiment.

The administrator terminal 11, the application server 12, the authentication server 13, the print server 14, and the client terminal 16 are substantialized by a computer system illustrated in FIG. 2 or the like. FIG. 2 illustrates an exemplary hardware structure of a computer system of the first embodiment.

Referring to FIG. 2, the computer system 100 includes an input device 101, a display device 102, an external I/F 103, a random access memory (RAM) 104, a read only memory (ROM) 105, a central processing unit (CPU) 106, a communication I/F 107, and a hard disk drive (HDD) 108, which are mutually connected via a bus B. The input device 101 and the display apparatus 102 may be connected to the bus B when necessary.

The input device 101 includes a keyboard, a mouse, or the like, by which the user inputs various operation signals. The display device 102 includes a display or the like to display a processing result obtained by the computer system 100.

The communication I/F 107 is an interface provided to connect the computer system 100 with the network N1. Thus, the computer system 100 can perform data communications with another device and/or another apparatus through the communication I/F 107.

The HDD 108 is a non-volatile memory device storing programs and/or data. The program and/or data to be stored is an operating system (OS), which is basic software controlling the entire computer system 100, application software providing various functions in the OS, and so on. Further, the HDD 108 manages the stored program and the stored data using a predetermined file system and/or a predetermined data base (DB).

The external I/F 103 is an interface with an external apparatus. The external apparatus is a recording medium 103a or the like. With this, the computer system 100 can read information from the recording medium 103a and/or write information to the recording medium 103a through the external I/F 103. The recording medium 103a includes a flexible disk, a compact disk (CD), a digital versatile disk (DVD), an SD memory card, a universal serial bus (USB) memory, or the like.

The ROM 105 is a non-volatile semiconductor memory (a memory device) which can hold a program and/or data even when a power source is powered off. The ROM 105 stores a program and data such as basic input/output system (BIOS), OS setup, network setup, or the like, which are started to be invoked at a time of booting up the computer system 100. The RAM 104 is a volatile semiconductor memory (a memory device) temporarily storing a program and/or data.

The CPU 106 reads the program and/or data onto the RAM 104 from the memory device such as the ROM 105, the HDD 108, or the like. The process is performed by the read program or data to thereby entirely substantialize controls or functions of the computer system 100.

Within the first embodiment, the administrator terminal 11, the application server 12, the authentication server 13, the print server 14, and the client terminal 16 can perform various processes described below by the hardware structure of the above computer system 100.

<Software Structure>
<<Client Terminal>>

Figure 3:
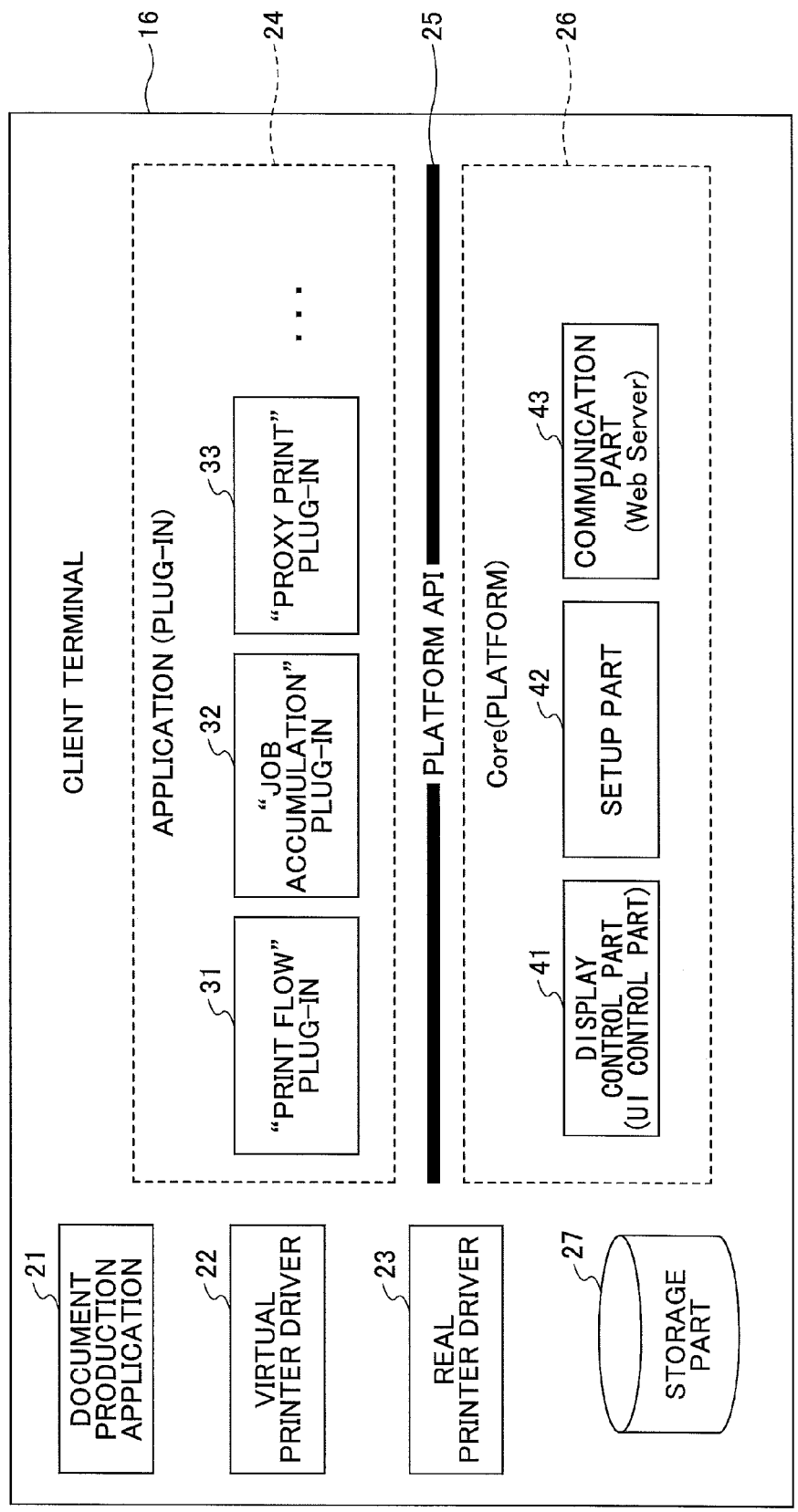
FIG. 3 is an exemplary processing block chart of a client terminal of the embodiment.

The client terminal 16 of the first embodiment is substantialized by, for example, a processing block chart illustrated in FIG. 3. FIG. 3 is an exemplary processing block chart of the client terminal 16 of the first embodiment.

The client terminal 16 substantializes a document production application 21, a virtual printer driver 22, a real printer driver 23, a plug-in 24, a platform API 25, a platform 26, and a storage part 27 by executing the program.

The plug-in 24 includes a print flow plug-in 31, a job accumulation plug-in 32, and a proxy print plug-in 33. The platform 26 includes a display control part (a UI control part) 41, a setup part 42, and a communication part 43.

The document production application 21 is an example of an application receiving a request for print from the user. The document production application 21 may be an application receiving a request for an output such as print from the user.

The virtual printer driver 22 is provided to convert the application data to an intermediate print data that are not model dependent and output the converted intermediate print data. Further, the intermediate print data is print data that are not dependent on models of the output apparatus 17 or the like. Data of a format of XML Paper Specification (XPS) is an example of the intermediate print data. The application data is an example of data to be output.

The real printer driver 23 is provided to convert the application data or the intermediate print data to real print data having a format that can be printed by the output apparatus 15 or the output apparatus 17 and to output the converted real print data. Data having a format of RAW is an example of the real print data.

The plug-in 24 is software operated on the platform 26. The plug-in 24 can use the function of the platform 26 by using the platform API 25.

The print flow plug-in 31 of the application (plug-in) 24 controls a print flow. The job accumulation plug-in 32 performs accumulation and administration of a print job. The proxy print plug-in 33 performs a process related to proxy print.

The platform API 25 is an interface where the plug-in 24 uses the function of the platform 26. The platform API 25 is an interface previously defined so that the platform 26 receives a request from the plug-in 24. The platform API 25 is structured by, for example, a function, a class, or the like.

The display control part 41 of the platform 26 controls display of the display apparatus 102 based on a request from, for example, the document production application 21, the plug-in 24, or the like. The setup part 42 performs setup of the plug-in 24. The communication part 43 performs communications with the print server 14 or the like. The storage part 27 stores setup information or the like.

In the client terminal 16, functions used by the plug-ins of the application 24 in common are aggregated in the platform 26 to thereby aggregate the processes. The mode of classification in the processing block chart illustrated in FIG. 3 is only an example. It is not necessary that the classification of hierarchy is done as illustrated in FIG. 3.

The plug-ins can be installed from, for example, the application server 12. The setup data related to the plug-ins can be installed from the application server 12 in a manner similar thereto. Further, because the plug-in desired by the administrator or the user can be appropriately installed and used, client terminal 16 need not have all of the print flow plug-in 31, the job accumulation plug-in 32, and the proxy print plug-in 33.

《Print Flow Plug-In》

Figure 4:
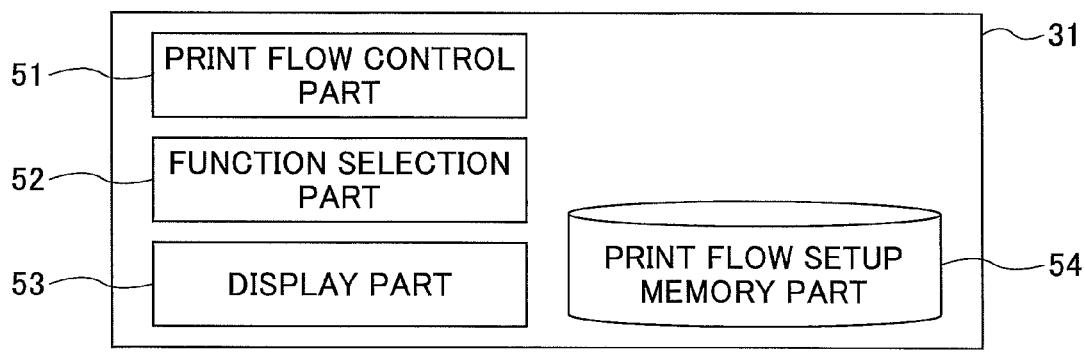

The print flow plug-in 31 of the client terminal 16 is substantialized by a processing block chart illustrated by, for example, FIG. 4. FIG. 4 is an exemplary processing block chart of the print flow plug-in.

The print flow plug-in 31 illustrated in FIG. 4 includes a print flow control part 51, a function selection part 52, a display part 53, and a print flow setup memory part 54. The print flow control part 51 controls an execution of the print flow. The function selection part 52 performs a selection of functions at the time of printing. The display part 53 causes a function selection screen to be described later to be displayed in the display apparatus 102 or the like. The print flow setup memory part 54 stores a setup of a print flow.

《Job Accumulation Plug-In》

Figure 5:
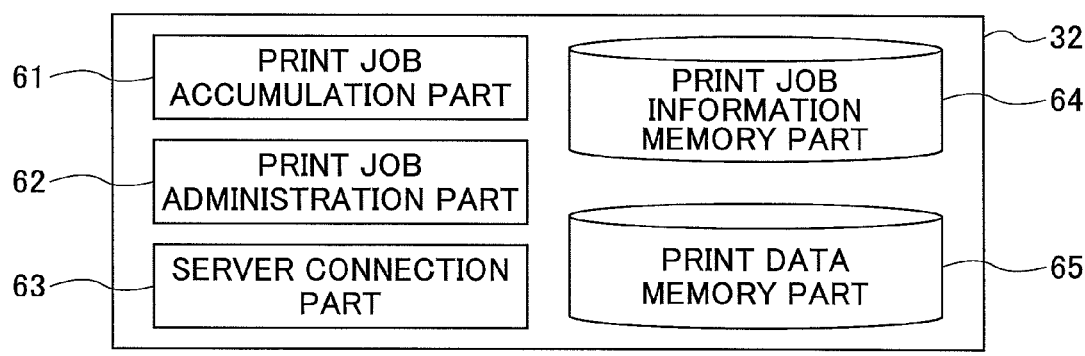

The job accumulation plug-in 32 of the client terminal 16 is substantialized by a processing block chart illustrated by, for example, FIG. 5. FIG. 5 is an exemplary processing block chart of the job accumulation plug-in. The job accumulation plug-in 32 illustrated in FIG. 5 includes a print job accumulation part 61, a print job administration part 62, a server connection part 63, a print job information memory part 64, and a print data memory part 65.

The print job accumulation part 61 performs an accumulation of the print jobs. The print job administration part 62 performs an administration of the print jobs. The server connection part 63 connects the job accumulation plug-in 32 to the authentication server 13 and the print server 14. The print job information memory part 64 stores print job information related to the print jobs. The print data memory part 65 stores an entity of data of the print job (intermediate print data, real print data, or the like).

《Proxy Print Plug-In》

Figure 6:
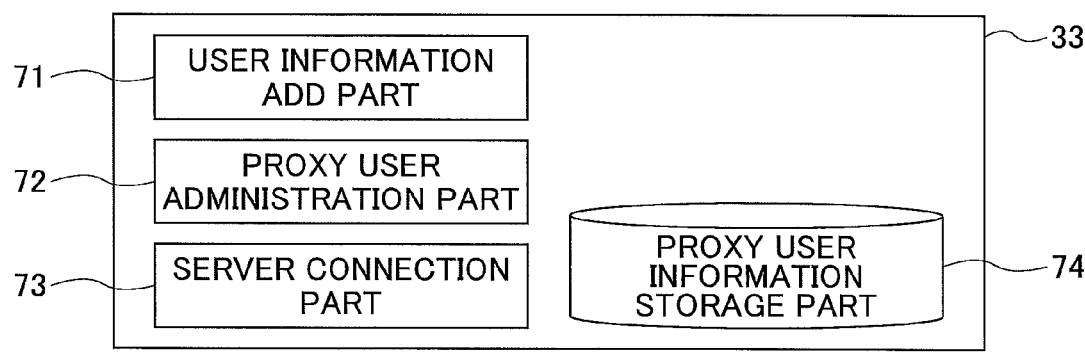

The proxy plug-in 33 of the client terminal 16 is substantialized by a processing block chart illustrated by, for example, FIG. 6. FIG. 6 is an exemplary processing block chart of the proxy print plug-in. The proxy print plug-in 33 illustrated in FIG. 6 includes a user information add part 71, a proxy user administration part 72, a server connection part 73, and a proxy user information storage part 74.

The user information add part 71 adds proxy user information such as a proxy user ID to the print job information. The proxy user administration part 72 administrates proxy user information. The server connection part 73 is provided to connect to the authentication server 13 or the like. The proxy user information storage part 74 stores proxy user information being information related to the proxy user.

《Print Job Information》

FIG. 7 illustrates a structure of an exemplary print job information. The print job information includes data items such as a job ID, a job name, an accumulation destination, an accumulation format, a user ID, a proxy user ID, and so on.

The job ID is identification information of the print job. The job name is the name of the print job. The accumulation destination is a location where the intermediate print data or the real print data is accumulated. For example, in a case where the accumulation destination is "Server01", the intermediate print data or the real print data is accumulated in the print server 14.

In a case where the accumulation destination is "Client01" or "Client02", the intermediate data or the real print data is accumulated in the client terminal 16 specified by "Client01" or "Client02". For example, the output apparatus 17 controls a request destination of the real print data in conformity with the print job information illustrated in FIG. 7.

The accumulation format is a format of print data accumulated in the accumulation destination. For example, referring to FIG. 7, in a case where the accumulation format is "XPS" in the print job information, the intermediate print data is accumulated in the accumulation destination. Meanwhile, in a case where the accumulation format is "PCL" in the print job information, the real print data is accumulated in the accumulation destination.

The intermediate print data is print data whose common specification related to a format is publicly released and a reedit of the intermediated print data is easy. Further, the data format of the intermediate print data is not limited to an XML Paper Specification (XPS). For example, the data format of the intermediate print data may be Portable Document Format (PDF) or the like.

Meanwhile, the real print data is print data of Page Description Language (PDL) depending on the printer. The data format of the real print data is not limited to Printer Control Language (PCL). For example, the data format of the real print data may be Post Script (PS) or the like.

The user ID is user identification information indicative of an owner of print data. The proxy user ID is a user ID of the proxy user who can perform the print job to print. For example, in a case where the user having a user ID of "11" logs in, the print job that has a job ID "4" and is owned by the user having the user ID of "11" and the print job having a job ID of "2" are displayed on a display apparatus such as an operation panel of the output apparatus 17.

《Proxy User Information》

FIG. 8 is an exemplary structural view of proxy user information. The proxy user information associates the user ID with the proxy user ID. For example, in the proxy user information illustrated in FIG. 8, users having user IDs of "11" and "12" are set as the proxy user of the user having the user ID of "1".

<Detailed Process>

Hereinafter, a detailed process of the print system 1 of the first embodiment is described.

《Print Job Accumulation Process》

Figure 9:
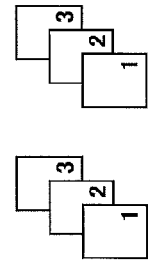
FIG. 9 illustrates an exemplary image of a print setup screen.

For example, the user operates a document production application 21 to open the print setup screen 1000 illustrated in FIG. 9 and selects the virtual printer driver 22 to request print. Thus, a print job accumulation process can be started.

FIG. 9 is an exemplary image chart of the print setup screen 1000. The user can select the virtual printer driver 22 from a printer selection column 1001 of the print setup screen 1000. The user can select the real printer driver 23 that causes print to be directly performed by the local output apparatus 15 in the printer selection column 1001 of the print setup screen 1000.

The user can designate a print set number in the print setup screen 1000. Further, when the user pushes a "property" button 1002 of the print setup screen 1000, a screen for conducting a detailed print setup is opened where a setup of a print side such as duplex/simplex, a setup of a color mode of color/B&W, and a setup of aggregation such as 2in1 can be performed. When the user pushes an "OK" button 1003 of the print setup screen 1000, the print can be requested.

Figure 10:
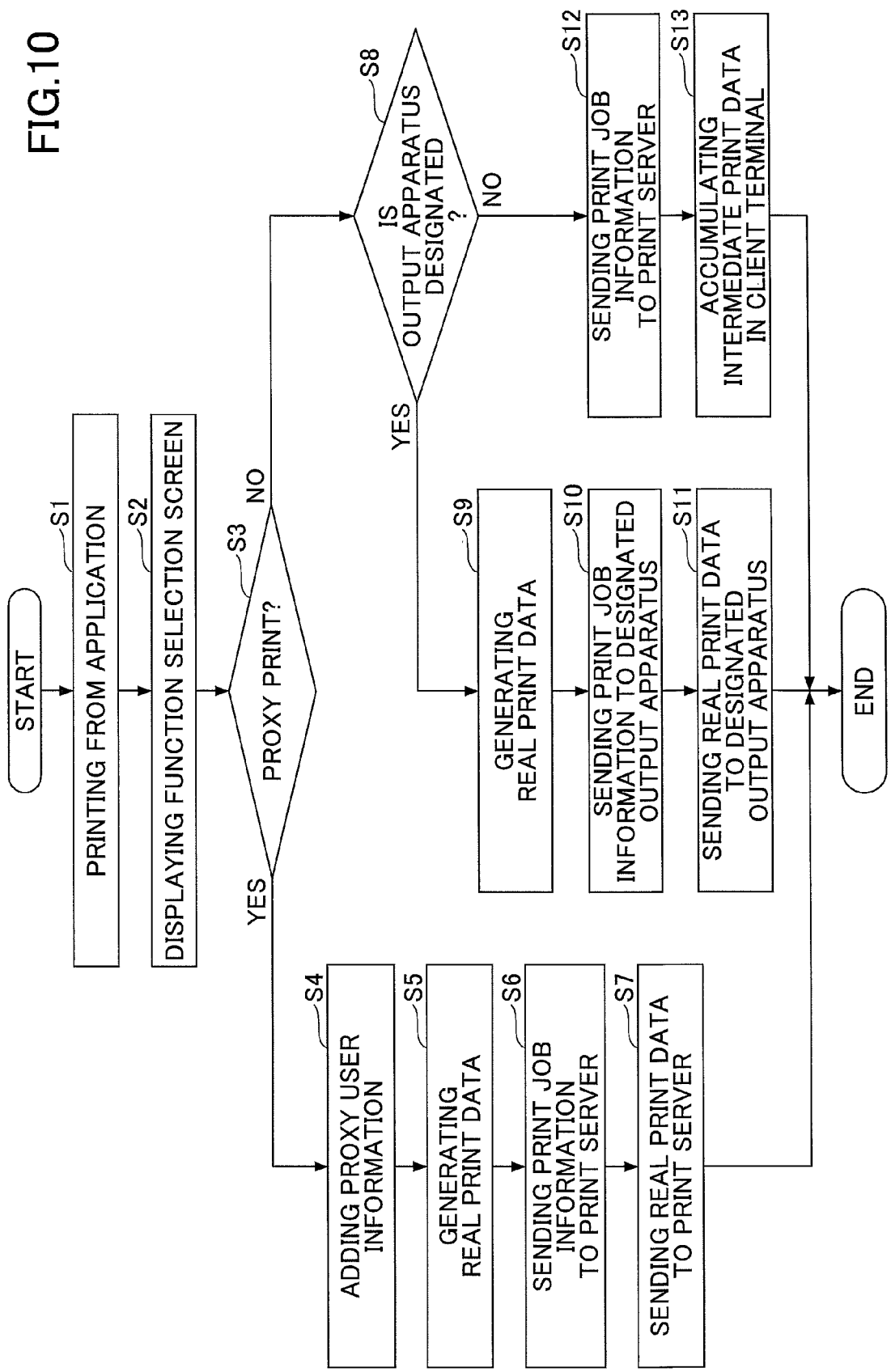
FIG. 10 is an exemplary flow chart of print job accumulation process.

When the user selects the virtual printer driver 22 to request the print, the client terminal 16 starts the print job accumulation process as illustrated in FIG. 10. FIG. 10 is an exemplary flow chart of a print job accumulation process.

In step S1, the document production application 21 sends a print event to the virtual printer driver 22. The virtual printer driver 22 sends the print event to the print flow control part 51 of the print flow plug-in 31. Further, the virtual printer driver 22 converts the application data to the intermediate print data.

Figure 11:
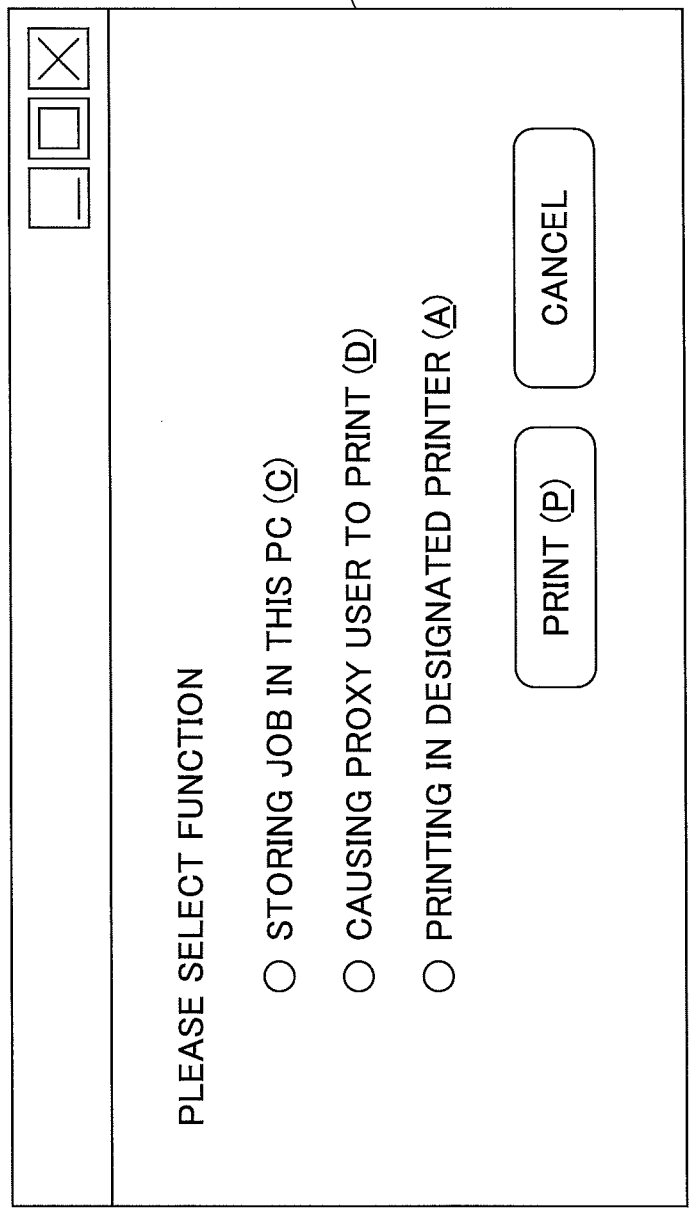
FIG. 11 illustrates an exemplary image of a function selection screen.

In step S2, the print flow control part 51 causes the function selection screen to be displayed on the display part 53 based on the print event sent from the virtual printer driver 22. FIG. 11 is an exemplary image chart of a function selection screen 1010.

The function selection screen 1010 is an example of a case where one function is selected among a function of "STORING JOB IN THIS PC", a function of "causing proxy user to print", and a function of "PRINTING IN DESIGNATED PRINTER".

In step S3, the user selects one function among the function of "STORING JOB IN THIS PC", the function of "causing proxy user to print", and the function of "PRINTING IN DESIGNATED PRINTER" from the function selection screen 1010. The function selection part 52 of the print flow plug-in 31 determines a function selected from the function selection screen 1010 by the user.

If the function selected by the user is the function of "causing proxy user to print", the function selection part 52 determines that the proxy print is selected. If the function selected by the user is not the function of "causing proxy user to print", the function selection part 52 determines in step S8 whether the function selected by the user is the function of "PRINT- ING IN DESIGNATED PRINTER" or the function of "STORING JOB IN THIS PC".

If it is determined that the proxy print is selected, the user information add part 71 of the proxy print plug-in 33 acquires a proxy user ID associated with the user (hereinafter, referred to as a print request user) who requests the print from the proxy user information storage part 74 in step S4. The user information add part 71 adds the user ID of the print request user and the proxy user ID to the print job information.

The user ID of the print request user to be added may be a user ID used at a time when the user logs in the client terminal 16 or a user ID used for authenticating in the authentication server 13. It is possible to previously set which user ID is used.

Further, user IDs of all proxy users associated with the print request user may be added as the proxy user ID. Alternatively, a selection screen where all proxy users associated with the user ID of the print request user are selectable is displayed, and the user ID of the proxy user selected by the print request user may be added. It is possible to previously set whether the proxy user IDs are entirely or partly selected.

In step S5, the print job accumulation part 61 of the job accumulation plug-in 32 uses the real printer driver 23 and generates the real print data from the intermediate print data. The print job administration part 62 administrates the real print data as an object to be administrated.

In step S6, the server connection part 63 sends the print job information to the print server 14. In step S7, the server connection part 63 sends the real print data to the print server 14.

If it is determined that the function of "PRINTING IN DESIGNATED PRINTER" is selected, the print job accumulation part 61 of the job accumulation plug-in 32 sends the print job information and the intermediate print data to the real printer driver 23 and instructs execution of the print job. The real printer driver 23 generates the real print data from the intermediate print data.

In step S10, the real printer driver 23 sends the print job information to the designated output apparatus 15 or the like. In step S11, the real printer driver 23 sends the real print data to the designated output apparatus 15 or the like. The output apparatus 15 or the like receiving the print job information and the real print data executes the print job to print the real print data.

The print job information may not be sent in step S10 and step S10 can be omitted. In a case where the function of "PRINTING IN DESIGNATED PRINTER" is selected, a selection screen for enabling to select the output apparatus as the output destination may be displayed so that the user can select the output apparatus. Alternatively, a preset output apparatus 15 (a default setup) may be designated. It is possible to previously set whether this selection of the default setup is used.

If it is determined that the function of "STORING JOB IN THIS PC" is selected, the server connection part 63 of the job accumulation plug-in 32 sends the print job information to the print server 14. Further, in step S13, the print job administration part 62 accumulates the intermediate print data in the print data memory part 65 and administrates the intermediate print data.

In the print job accumulation process, the real print data can be accumulated in the print server 14 when the user selects the proxy print. The content of the print setup to be changed is limited for the real print data. However, because of characteristic of the proxy print, a case where the print setup is changed while the print job is executed seems to rarely occur.

By accumulating the real print data in the print server 14, even if the power source of the client terminal 16 is turned off, the proxy user can execute the print job.

In the print job accumulation process illustrated in FIG. 10, by causing the user to select the function by displaying the function selection screen 1010 for each client terminal 16 at each print, it is possible to easily change the accumulation setup such as the accumulation destination or the accumulation format.

《Print Job Output Process》

Figure 12:
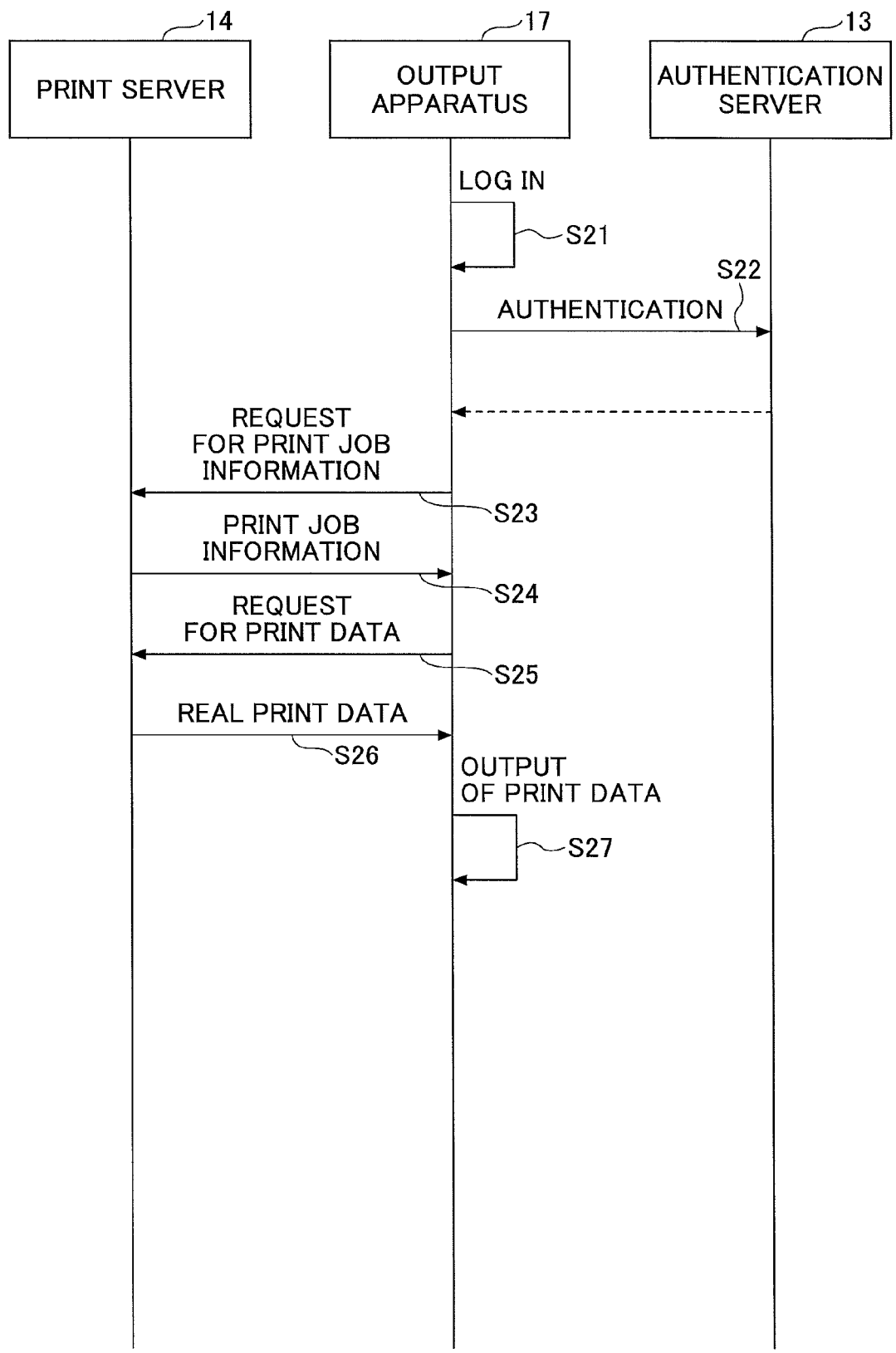
FIG. 12 is an exemplary flow chart of a print job output process.

When the print data is accumulated in the print server 14, the print system 1 performs a print job output process as illustrated in, for example, FIG. 12. FIG. 12 is an exemplary flow chart of the print job output process. Described is an example that the output apparatus 17 executes the print job.

In step S21, the user inputs authentication information in an operation panel or the like of the output apparatus 17 and requests a login. When the login is requested by the user to the output apparatus 17, the output apparatus 17 requests the authentication by sending authentication information to the authentication server 13 in step S22. The authentication server 13 performs the authentication using the received authentication information and returns a result of the authentication to the output apparatus 17. Here, the description is given on the premise that the authentication is successful. In a case where the result of the authentication indicates a failed authentication, an issue that the login is failed is displayed on the display apparatus such as the operation panel, and the process on or after step S23 is not performed.

In step S23, the output apparatus 17 requests the print job information of the user who is successfully authenticated to the print server 14. In step S24, the print server 14 searches the print job information to which the user ID of the successfully authenticated user is given. The print server 14 sends a list of the searched print job information to the output apparatus 17.

The output apparatus 17 displays the list of the received print job information and causes the user to select the print job information from the list of the print job information. When the user selects the print job information from the list of the print job information, the output apparatus 17 can determine the accumulation destination of the print data of the print job using the accumulation destination of the print job information selected by the user. Here, the print server 14 is determined as the accumulation destination of the print data. In step S25, the output apparatus 17 requests the print data of the print job selected by the user to the print server 14.

Within the first embodiment, the print data accumulated in the print server 14 is the real print data. In step S26, the print server 14 sends the real print data of the print job requested from the output apparatus 17 to the output apparatus 17. In step S27, the output apparatus 17 outputs the received real print data.

Figure 13:
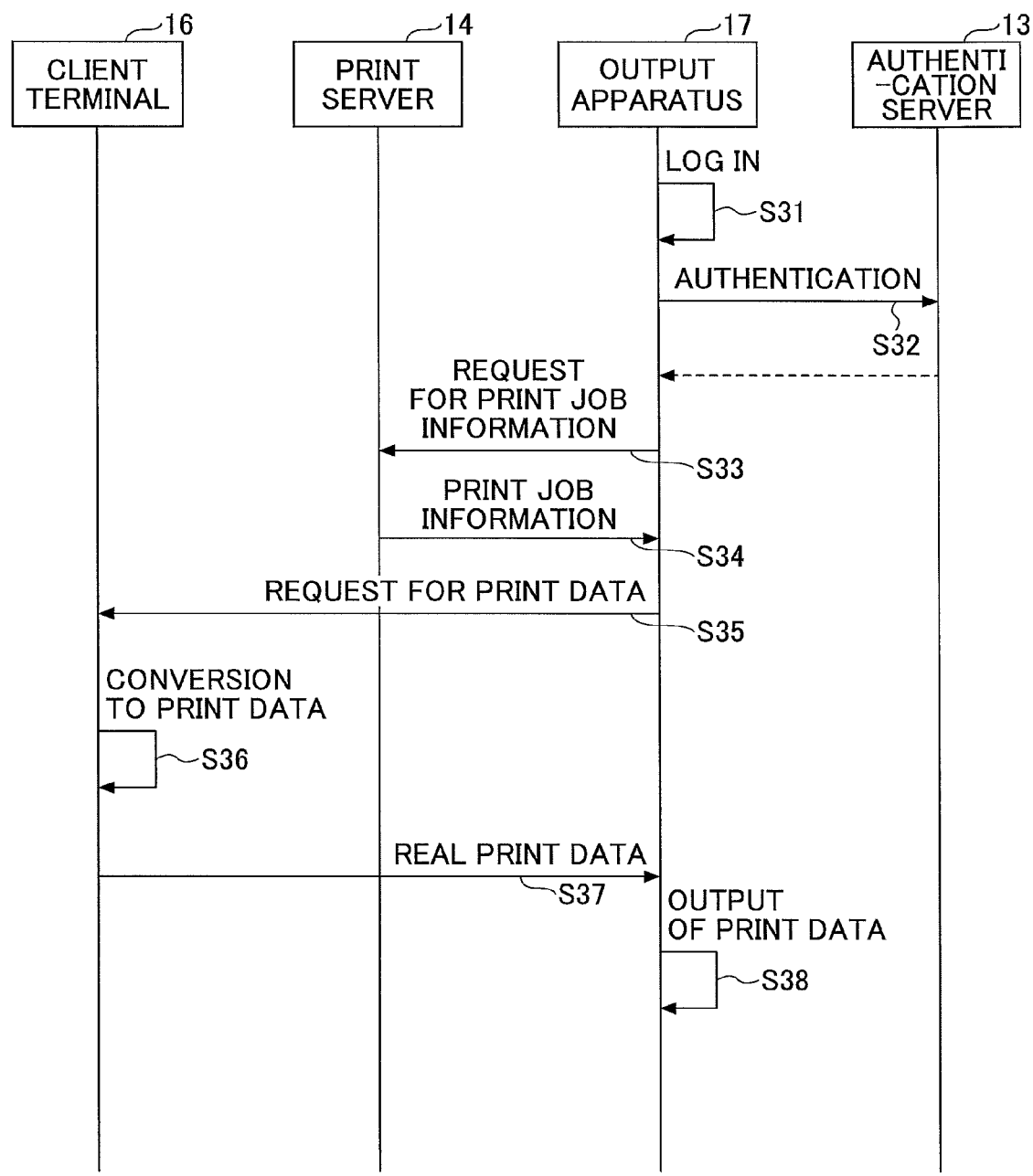
FIG. 13 is another exemplary flow chart of the print job output process.

When the print data is accumulated in the client terminal 16, the print system 1 performs the print job output process as illustrated in, for example, FIG. 13. FIG. 13 is another exemplary flow chart of the print job output process. Described is an example that the output apparatus 17 executes the print job.

In step S31, the user inputs the authentication information in the operation panel or the like of the output apparatus 17 and requests the login. When the login is requested by the user to the output apparatus 17, the output apparatus 17 requests the authentication by sending the authentication information to the authentication server 13 in step S32. The authentication server 13 performs the authentication using the received authentication information and returns the result of the authentication to the output apparatus 17. Here, the description is given on the premise that the authentication is successful. In a case where the result of the authentication indicates a failed authentication, an issue that the login is failed is displayed on the display apparatus such as the operation panel, and the process on or after step S33 is not performed.

In step S33, the output apparatus 17 requests the print job information of the user who is successfully authenticated to the print server 14. In step S34, the print server 14 searches the print job information to which the user ID of the successfully authenticated user is given. The print server 14 sends the list of the searched print job information to the output apparatus 17.

The output apparatus 17 displays the list of the received print job information and causes the user to select the print job information from the list of the print job information. When the user selects the print job information from the list of the print job information, the output apparatus 17 can determine the accumulation destination of the print data of the print job using the accumulation destination of the print job information selected by the user. Here, the client terminal 16 is determined to be the accumulation destination of the print data. In step S35, the output apparatus 17 requests the print data of the print job selected by the user to the print server 14.

Within the first embodiment, the print data accumulated in the print server 14 is the intermediate print data. In step S36, the print job administration part 62 of the job accumulation plug-in 32 uses the real printer driver 23 and generates the real print data from the intermediate print data.

In step S37, the client terminal 16 sends the real print data of the print job requested from the output apparatus 17 to the output apparatus 17. In step S38, the output apparatus 17 outputs the received real print data.

Figure 14:
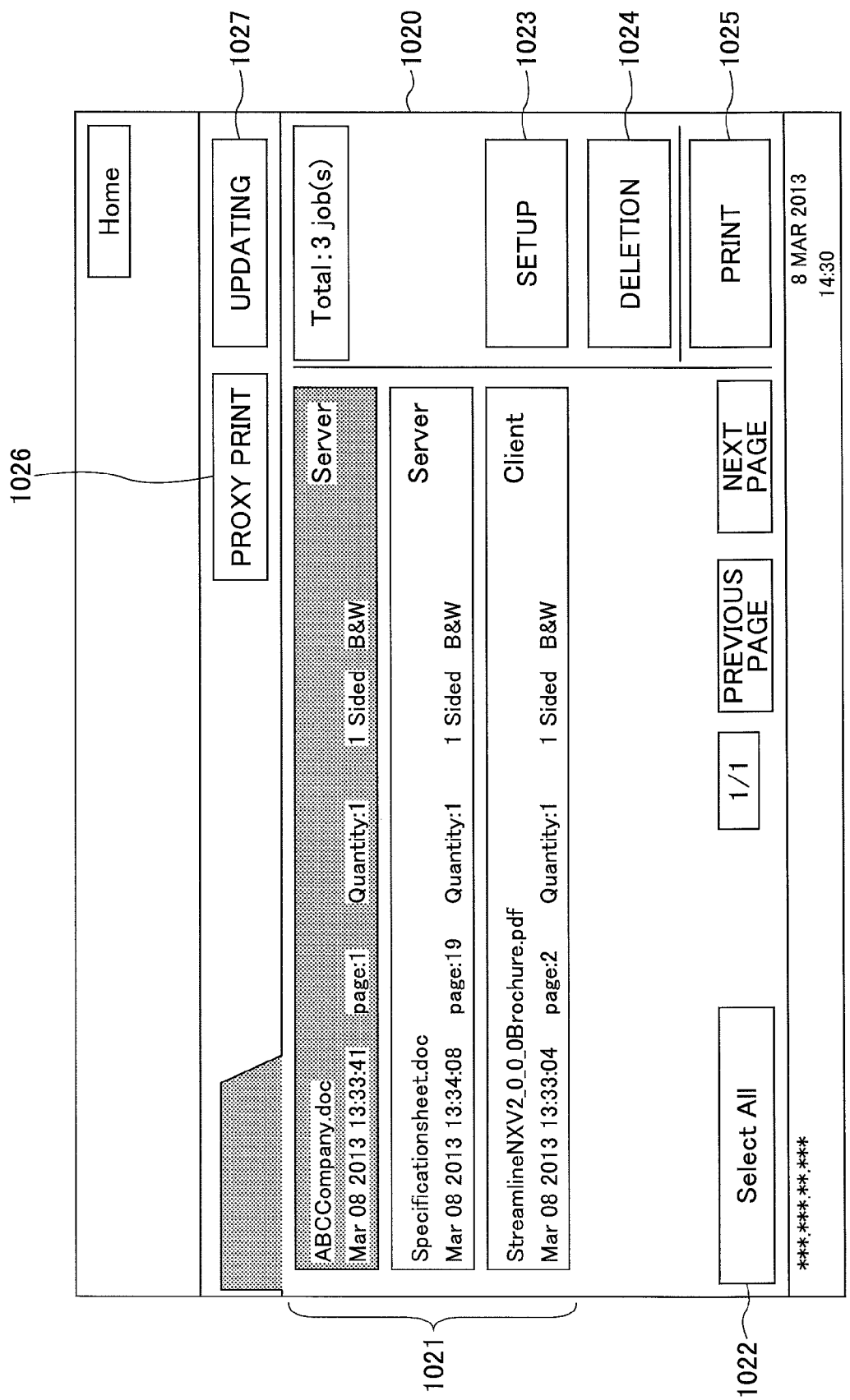
FIG. 14 illustrates another exemplary image of the print job information list screen.

The output apparatus 17 displays a list of the received print job information on the display apparatus such as the operation panel as illustrated in, for example, FIG. 14. FIG. 14 illustrates an image of an exemplary print job information list screen.

The print job information list screen 1020 illustrated in FIG. 14 includes a list 1021 of the print job information of the successfully authenticated user. The list 1021 of the print job information is displayed using a selectable component such as a button. The components indicating each print job information are, for example, the print job name, the data, the number of pages, the set number, the print side, the color mode, and the accumulation destination of the print data.

Further, the print job information list screen 1020 illustrated in FIG. 14 includes a Select All button 1022, a SETUP button, a DELETION button 1024, a PRINT button 1025, a PROXY PRINT button 1026, and an UPDATING button 1027.

The Select All button 1022 is provided to select all print job information in the list of the print job information. The SETUP button 1023 is provided to display the print setup change screen of the selected print job information. The DELETION button 1024 is provided to delete the selected print job information. The PRINT button 1025 is provided to request to start print of the selected print job information.

The PROXY PRINT button 1026 is provided to cause the print job information, which is printable, to be displayed by a login user as the proxy user. The UPDATING button 1027 is provided to update the list 1021 of the print job information. When the UPDATING button 1027 is pushed, the output apparatus 17 acquires again the print job information from the print server 14.

Figure 15:
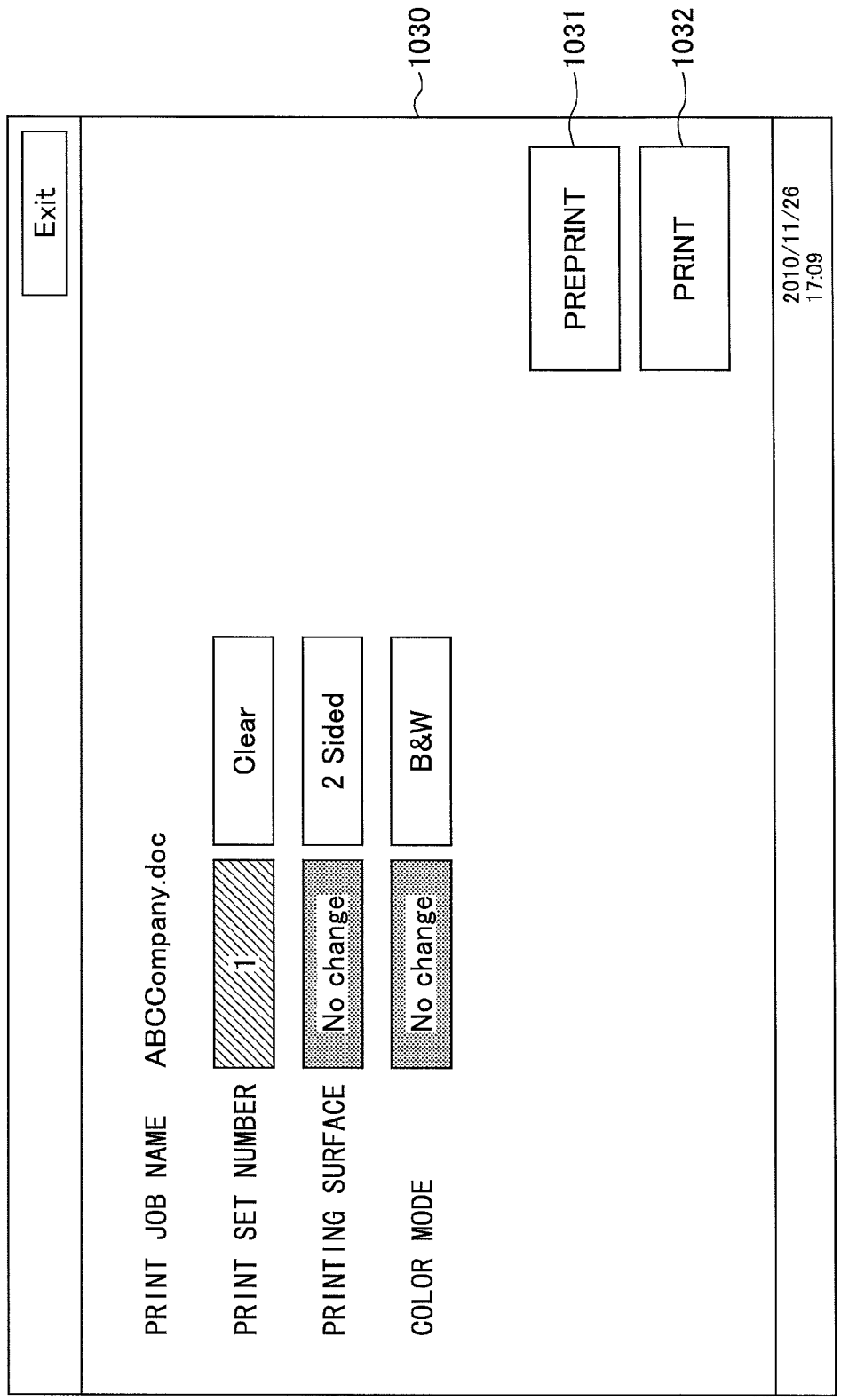
FIG. 15 illustrates an exemplary image of a print setup change screen.

When the SETUP button 1023 is pushed, the output apparatus 17 displays a print setup change screen 1030 illustrated in, for example, FIG. 15 on the display apparatus such as the operation panel. FIG. 15 illustrates an exemplary image of the print setup screen 1030.

The print setup change screen 1030 illustrated in FIG. 15 includes print setups, which are included in print setups of the print job information selected when the setup button 1023 is pushed and can be changed. As an exemplary print setup being changeable, the print setup change screen 1030 illustrated in FIG. 15 displays PRINT SET NUMBER, PRINT SIDE, and COLOR MODE. Because the print setup change screen 1030 illustrated in FIG. 15 illustrates an example where the print job information, which is converted to the real print data, is selected, the number of the changeable print setups is smaller than that in a case where the print job information of the intermediate print data is selected.

In the print setup change screen 1030, it is possible to select whether the print side is not changed or the print side is changed to the duplex print. In the print setup change screen 1030, it is possible to select whether the color mode is not changed or the color mode is changed to monochrome. The print setup change screen 1030 includes a PREPRINT button 1031 and a PRINT button 1032.

The PREPRINT button 1031 is provided to check the print. The PRINT button 1032 is provided to start the print in the print setup displayed on the print setup change screen 1030. When the PRINT button 1032 is pushed, the output apparatus 17 starts outputting the print data in the print setup displayed on the print setup change screen 1030.

<General Overview>

Within the print system 1 of the first embodiment, by displaying the function selection screen 1010 on the client terminal 16 to enable the user to select the functions, the change of the accumulation setup can be easily performed in comparison with a case where a screen for detailed print setups is opened to enable the user to perform the detailed print setups.

Second Embodiment

A print system 1 of a second embodiment differs from the print system 1 of the first embodiment at a point that the content of the functions selected from the function selection screen. Because the system structure, the hardware structure, and the software structure of the print system 1 of the second embodiment are similar to those of the print system 1 of the first embodiment, the description is omitted.

<Detailed Process>

Hereinafter, a detailed process of the print system 1 of the second embodiment is described.

《 Print Job Accumulation Process》

For example, the user operates the document production application 21 to open the print setup screen 1000 illustrated in FIG. 9 above and selects the virtual printer driver 22 to request the print. Thus, the print job accumulation process can be started.

Figure 16:
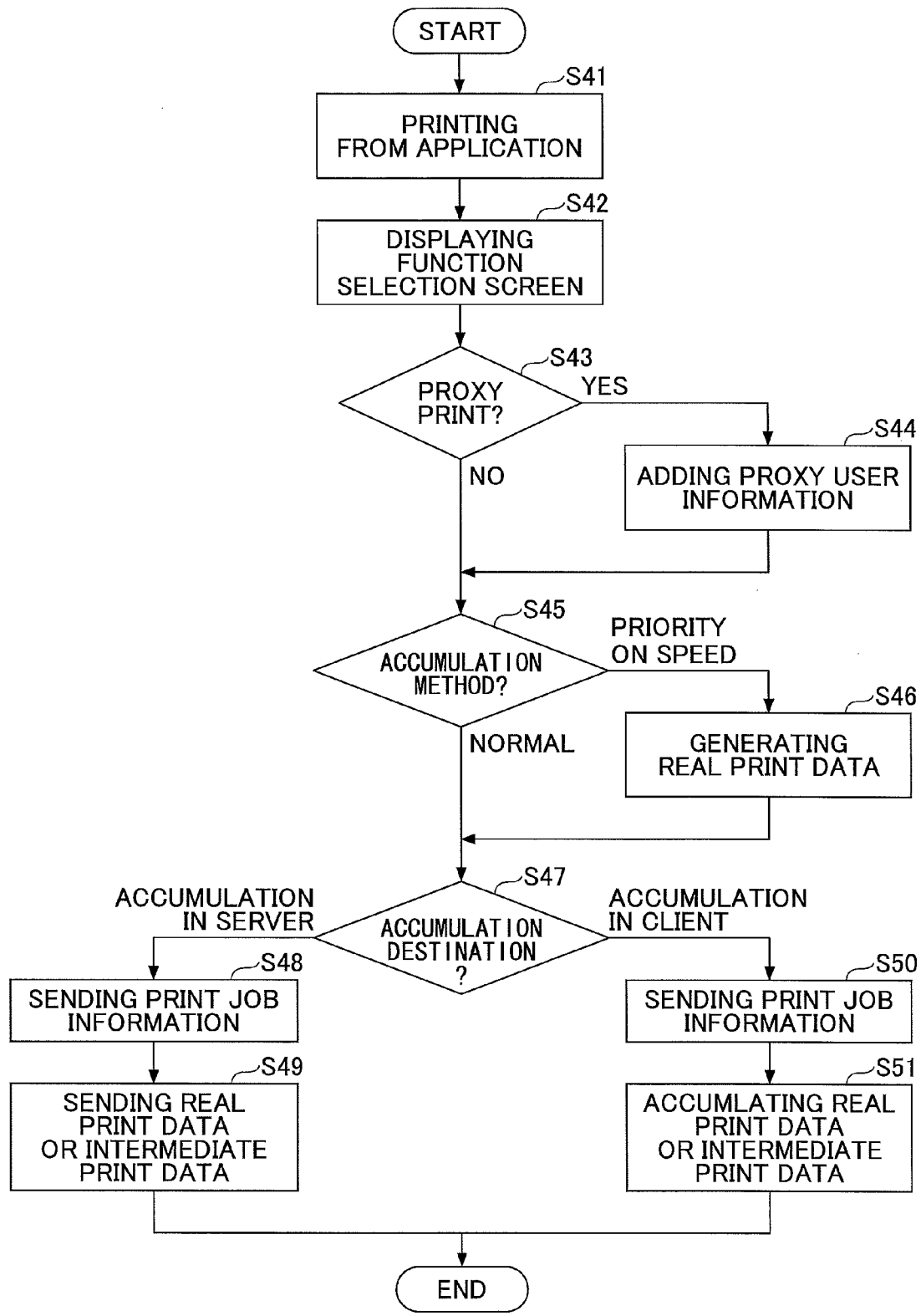
FIG. 16 is another exemplary flow chart of the print job accumulation process.

When the user selects the virtual printer driver 22 in the print setup screen 1000 to request the print, the client terminal 16 starts a print job accumulation process as illustrated in FIG. 16. FIG. 16 is another exemplary flow chart of the print job accumulation process.

In step S41, the document production application 21 sends a print event to the virtual printer driver 22. The virtual printer driver 22 sends the print event to the print flow control part 51 of the print flow plug-in 31. Further, the virtual printer driver 22 converts the application data to the intermediate print data.

In step S42, the print flow control part 51 causes the function selection screen to be displayed on the display part 53 based on the print event sent from the virtual printer driver 22. FIG. 17 illustrates another exemplary image of a function selection screen 1040.

The function selection screen 1040 is provided for the user to select an accumulation destination of print data, whether proxy print is performed, and an accumulation method of the print data. The user selects the accumulation destination of print data, whether proxy print is performed, and the accumulation method of the print data in the function selection screen 1040.

In step S43, the function selection part 52 of the print flow plug-in 31 determines whether the user selects "PERFORM PROXY PRINT" in the function selection screen 1040. If the user selects "PERFORM PROXY PRINT", the user information add part 71 of the proxy print plug-in 33 acquires a proxy user ID associated with the user who requests the print and adds the acquired proxy user ID to the print job information in step S44.

The proxy user ID is previously acquired from the authentication server 13 by the server connection part 73 of the proxy print plug-in 33 and is held by the proxy user information storage part 74. Further, the proxy print plug-in 33 may display a proxy user selection screen (not illustrated) so that the proxy user is dynamically selected and the proxy user ID of the selected proxy user may be added to the print job information. In a case where the proxy print plug-in does not exist in the client terminal 16, an option of the proxy print of whether the proxy print is performed may not be displayed on the function selection screen 1040.

In step S43, if the user does not select "NOT PERFORM PROXY PRINT", the user information add part 71 of the proxy print plug-in 33 skips the step S44. In step S45, the function selection part 52 of the print flow plug-in 31 determines which of "NORMAL" or "PRIORITY ON SPEED" the user selects as the accumulation method in the function selection screen 1040.

If the user selects "PRIORITY ON SPEED" as the accumulation method, the print job accumulation part 61 of the job accumulation plug-in 32 uses the real printer driver 23 in step S46 and generates the real print data from the intermediate print data. The print job administration part 62 administrates the real print data as an object to be administrated.

If the user selects "NORMAL" in step S45, the print job accumulation part 61 of the job accumulation plug-in 32 skips step S46. The print job administration part 62 administrates the intermediate print data as the object to be administrated.

In step S47, the function selection part 52 of the print flow plug-in 31 determines which of "PRINT SERVER" or "CLIENT TERMINAL" the user selects as an accumulation destination in the function selection screen 1040.

If the user selects "PRINT SERVER" as the accumulation destination, the server connection part 63 of the job accumulation plug-in 32 sends the print job information to the print server 14 in step S48. In step S49, the server connection part 63 sends the real print data or the intermediate print data, which are administrated as the object to be administrated, to the print server 14.

If the user selects "CLIENT TERMINA" as the accumulation destination, the server connection part 63 of the job accumulation plug-in 32 sends the print job information to the print server 14 in step S50.

In step S51, the print job administration part 62 of the job accumulation plug-in 32 accumulates the real print data or the intermediate print data, which are administrated as the object to be administrated, in the print data memory part 65 and administrates the real print data or the intermediate print data in the print data memory part 65.

In the print job accumulation process illustrated in FIG. 16, the virtual printer driver 22 is selected to request the print. However, in a case where the real printer driver 23 is selected to request the print, the function selection screen 1040 may be displayed. In this case, because the real print data is output from the real printer driver 23, the options of the accumulation methods of the print data are not displayed on the function selection screen 1040.

As described, in the function selection screen 1040, options for selecting by a user may be changed depending on the type of the installed plug-in 24 or the type of the printer driver requesting the print.

Within the print job accumulation process illustrated in FIG. 16, the function selection screen 1040 is displayed on the client terminal 16 for each print so that the user can select the accumulation destination of the print data, whether the proxy print is performed, the accumulation method of the print data, or the like. Therefore, in the print job accumulation process illustrated in FIG. 16, a change in an accumulation setup such as an accumulation destination or an accumulation format can be easily performed.

《Print Job Output Process》

Figure 18:
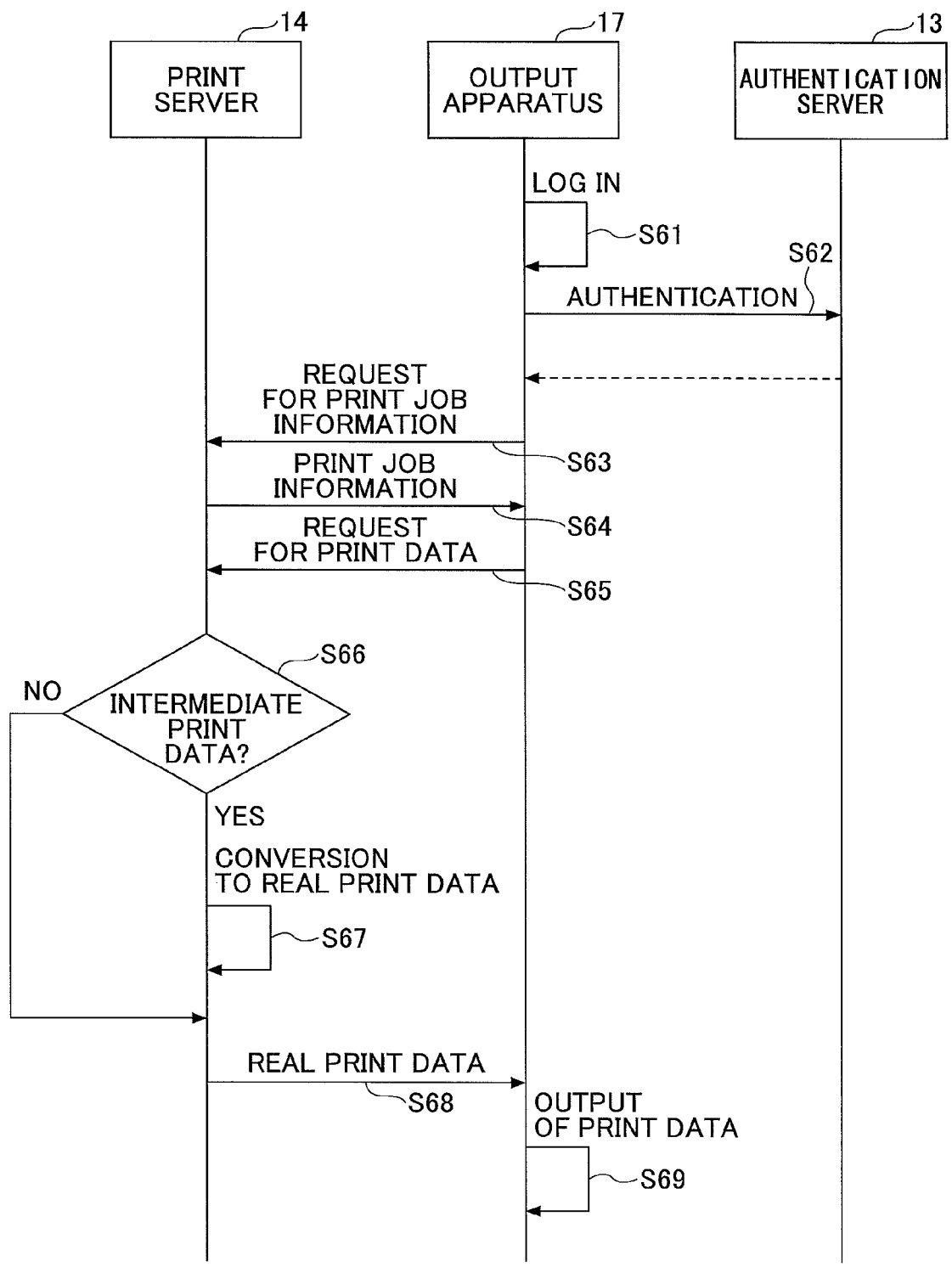
FIG. 18 is another exemplary flow chart of the print job output process.

When the print data is accumulated in the print server 14, the print system 1 performs a print job output process as illustrated in, for example, FIG. 18. FIG. 18 is another exemplary flow chart of the print job output process. Described is an example that the output apparatus 17 executes the print job.

Because the processes of steps S61 to S65 are similar to the processes of steps S21 to S25 of FIG. 12, explanation is omitted. In step S66, the print server 14 determines whether the print data of the print job requested from the output apparatus 17 is the intermediate print data.

If the print data of the print job requested from the output apparatus 17 is the intermediate print data, the print server 14 proceeds to step S67 to convert the intermediate print data to the real print data using the real printer driver (not illustrated). If the print data of the print job requested from the output apparatus is not the intermediate print data, the intermediate print data is already converted to the real print data, the process of step S67 is skipped.

For example, if the user selects "NORMAL" from the function selection screen 1040 as the accumulation method, the intermediate print data is accumulated in the print server 14, the intermediate print data is changed to the real print data 14 in step S67. Further, if the user selects "PRIORITY ON SPEED" from the function selection screen 1040 as the accumulation method, the real print data is already accumulated in the print server 14, the conversion from the intermediate print data to the real print data 14 is skipped.

In step S68, the print server 14 sends the real print data of the print job requested from the output apparatus 17 to the output apparatus 17. In step S69, the output apparatus 17 outputs the received real print data.

Figure 19:
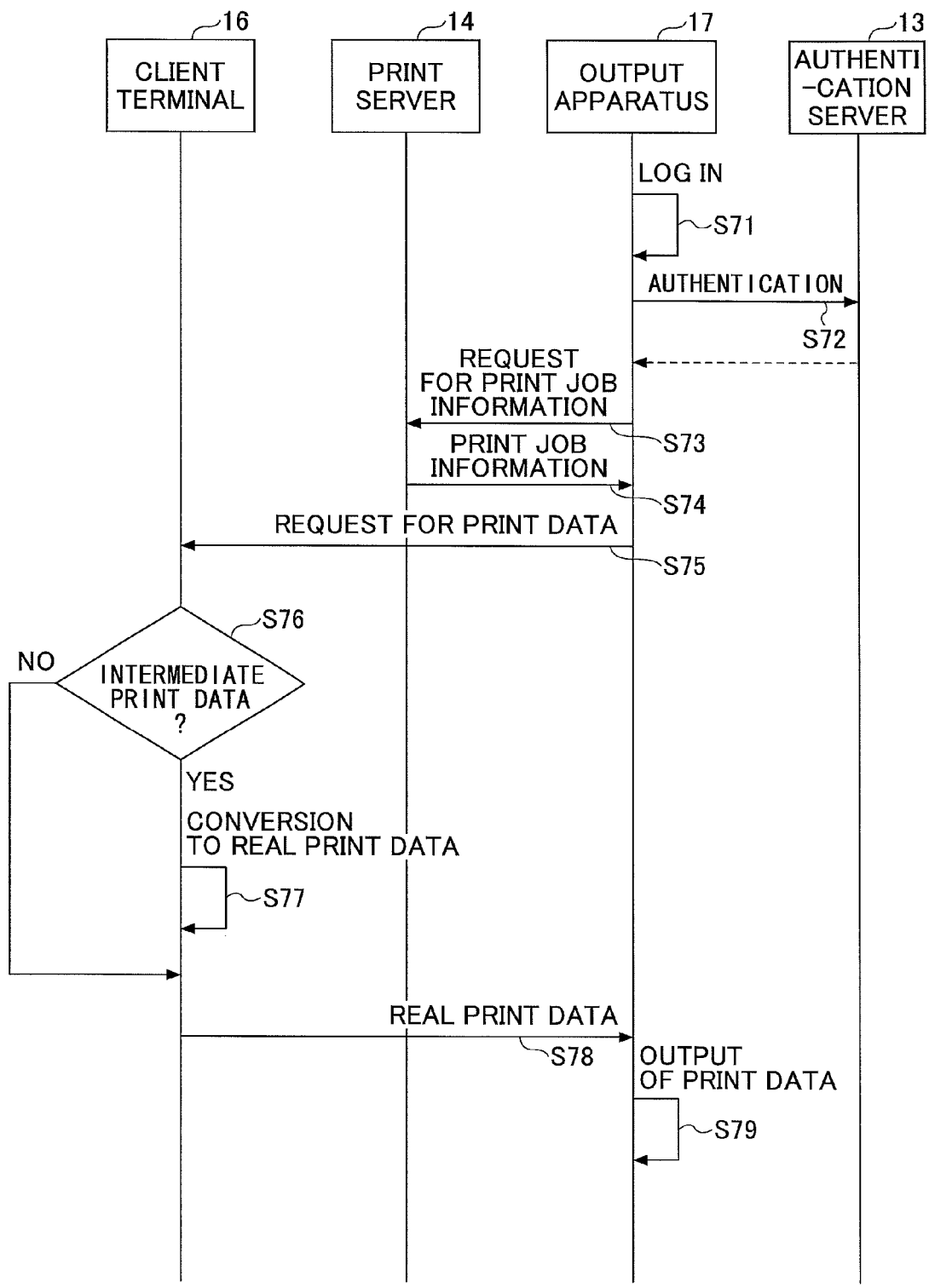
FIG. 19 is another exemplary flow chart of the print job output process.

When the print data is accumulated in the client terminal 16, the print system 1 performs the print job output process as illustrated in, for example, FIG. 19. FIG. 19 is another exemplary flow chart of the print job output process. Described is an example that the output apparatus 17 executes the print job.

Because the processes of steps S71 to S75 are similar to the processes of steps S31 to S35 of FIG. 13, explanation is omitted. In step S76, the client terminal 16 determines whether the print data of the print job requested from the output apparatus 17 is the intermediate print data.

If the print data of the print job requested from the output apparatus 17 is the intermediate print data, the client terminal 16 proceeds to step S77 to convert the intermediate print data to the real print data using the real printer driver 23. If the print data of the print job requested from the output apparatus 17 is not the intermediate print data, the intermediate print data is already converted to the real print data, the process of step S77 is skipped.

For example, if the user selects "NORMAL" from the function selection screen 1040 as the accumulation method, the intermediate print data is accumulated in the client terminal 16, the intermediate print data is changed to the real print data in step S77.

Further, if the user selects "PRIORITY ON SPEED" from the function selection screen 1040 as the accumulation method, the real print data is already accumulated in the client terminal 16, the conversion from the intermediate print data to the real print data is skipped.

In step S78, the client terminal 16 sends the real print data of the print job requested from the output apparatus 17 to the output apparatus 17. In step S79, the output apparatus 17 outputs the received real print data.

The output apparatus 17 displays a list of the received print job information on the display apparatus such as the operation panel as illustrated in, for example, FIG. 14. When the SETUP button 1023 on the print job information list screen 1020 illustrated in FIG. 14 is pushed, the output apparatus 17 displays the print setup change screen as illustrated in, for example, FIG. 15 or FIG. 20 on the display apparatus such as the operation panel. FIG. 20 illustrates another exemplary image of the print setup change screen.

When the print data of the selected print job information is the real print data, the output apparatus 17 displays the print setup change screen 1030 illustrated in FIG. 15. On the other hand, when the print data of the selected print job information is the intermediate print data, the output apparatus 17 displays the print setup change screen 1050 illustrated in FIG. 20.

In the print setup change screen 1030 illustrated in FIG. 15, because the print data of the print job information selected when the SETUP button 1023 is pushed is converted to the real print data, the print setup being changeable is limited. On the other hand, in the print setup change screen 1050 illustrated in FIG. 20, because the print data of the print job information selected when the SETUP button 1023 is pushed is the intermediate print data, the number of the print setups being changeable is greater than that in the print setup change screen 1050.

As an exemplary print setup being changeable, the print setup change screen 1050 illustrated in FIG. 20 displays PRINT SET NUMBER, PRINT SIDE, COLOR MODE, AGGREGATION, and BOOKBINDING. In the print setup change screen 1050 illustrated in FIG. 20, simplex print or duplex print is selectable. In the print setup change screen 1050 illustrated in FIG. 20, color print or monochrome print is selectable.

In the print setup change screen 1050 illustrated in FIG. 20, no aggregation print, aggregation print of 2 in 1, or aggregation print of 4 in 1 is selectable. In the print setup change screen 1050 illustrated in FIG. 20, no bookbinding print or bookbinding print is selectable. The print setup change screen 1050 includes a PREPRINT button 1051 and a PRINT button 1052.

The PREPRINT button 1051 is provided to check the print. The PRINT button 1052 is provided to start the print in the print setup displayed on the print setup change screen 1050. When the PRINT button 1052 is pushed, the output apparatus 17 starts outputting the print data in the print setup displayed on the print setup change screen 1050.

<General Overview>

Within the print system 1 of the second embodiment, by displaying the function selection screen 1040 on the client terminal 16 to enable the user to select the functions, the change of the accumulation setup can be easily performed in comparison with a case where a screen for detailed print setups is opened to enable the user to perform the detailed print setups.

The print system 1 of the first and second embodiments is an example of the output system. A selection receipt unit corresponds to the print flow plug-in 31. A determination unit and an accumulation control unit corresponds to the job accumulation plug-in 32. An output control unit corresponds to the function of the output apparatus 17. A proxy output control unit corresponds to the proxy print plug-in 33.

According to the embodiments of the present invention, the accumulation setup for each setup can be easily performed.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device.

The computer software can be provided to the programmable device using any storage medium for storing processor readable code such as a floppy disk, hard disk, CD ROM, magnetic tape device or solid state memory device.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the output system has been described in detail, it should be understood that various changes, substitutions, and alterations could be made thereto without departing from the spirit and scope of the invention.

This application is based upon and claims the benefit of priority of the prior Japanese Patent Application No. 2013-191119, filed on Sep. 13, 2013, the entire contents of which are incorporated herein by reference.

What is claimed is:

1. An output system including a terminal apparatus, an output apparatus, at least one information processing apparatus, and a network for connecting the terminal apparatus, the output apparatus, the at least one information processing apparatus, the output system comprising:
   a first storage included in the terminal apparatus;
   a second storage included in the at least one information processing apparatus;
   a selection receipt unit that is implemented by a processor and displays a function selection screen enabling a user to select a function from among a plurality of functions in response to an output request of data to be output received from the user and causes the user to select the function;

a determination unit that is implemented by the processor and determines, in response to the function selected by the user, whether an accumulation destination of output data the first storage or the second storage;

an accumulation control unit, that is implemented by the processor and causes the determined accumulation destination to store the output data;

a management unit, included in the at least one information processing apparatus, that manages information relevant to the output data including the accumulation destination of the output data; and an output control unit that acquires, when the output apparatus requests to acquire the output data managed by the management unit, the output data from the accumulation destination and outputs the output data at the output apparatus.

2. The output system according to claim 1, further comprising:

a proxy output control unit that selects, in a case where the function selected by the user from the function screen is an proxy output that causes a proxy user to output the data to be output, the proxy user associated with the user and adds information of the proxy user to the information relevant to the output data, wherein the determination unit determines that the accumulation destination of the output data is the second storage.

3. The output system according to claim 1, wherein the determination unit determines, in the case where the function selected by the user from the function screen is an accumulation of the output data in the terminal apparatus, that the accumulation destination of the output data is the first storage included in the terminal apparatus, a format of the accumulated output data not depending on the output apparatus.

4. The output system according to claim 1, wherein the determination unit determines, in the case where the function selected by the user from the function screen is a designation of the output apparatus to which the output data is output, the output data is not accumulated in the first and second storages.

5. The output system according to claim 1, wherein the determination unit determines, in the case where the function selected by the user from the function screen is the speed priority in outputting the output data from the output apparatus, an accumulation of the output data in a format that depends on the output apparatus as the accumulation method of the output data.

6. The output system according to claim 1, wherein the determination unit determines, in the case where the function selected by the user from the function screen is a designation of the accumulation destination of the output data, the accumulation destination of the information relevant to the output data in response to the designation of the accumulation destination of the output data.

7. A method of outputting data in an output system including a terminal apparatus including a first storage, an output apparatus, at least one information processing apparatus including a second storage, and a network for connecting the terminal apparatus, the output apparatus, the at least one information processing apparatus, the method comprising:

displaying, by a processor of the terminal apparatus, a function selection screen enabling a user to select a function from among a plurality of functions in response to an output request of data to be output received from the user and causes the user to select the function;

determining, by the processor in response to the function selected by the user, whether an accumulation destination of output data is the first storage or the second storage;

causing, by the processor, the determined accumulation destination to store the output data;

managing, by the at least one information processing apparatus, information relevant to the output data including the accumulation destination of the output data; and acquiring, by the output apparatus when the output apparatus requests to acquire the output data managed by the management unit, the output data from the accumulation destination and outputs the output data at the output apparatus.

8. The method of outputting the data according to claim 7, further comprising:

selecting, by the processor in a case where the function selected by the user from the function screen is an proxy output that causes a proxy user to output the data to be output, the proxy user associated with the user and adds information of the proxy user to the information relevant to the output data, wherein the determining the accumulation method and the accumulation destination of the output data determines that the accumulation destination of the output data is the second storage.

9. The method of outputting the data according to claim 7, wherein the determining the accumulation method and the accumulation destination of the output data determines, in the case where the function selected by the user from the function screen is an accumulation of the output data in the terminal apparatus, that the accumulation destination of the output data is the terminal apparatus, a format of the accumulated output data not depending on the output apparatus.

10. The method of outputting the data according to claim 7, wherein the determining the accumulation method and the accumulation destination of the output data determines, in the case where the function selected by the user from the function screen is a designation of the output apparatus to which the output data is output, the output data is not accumulated in the first and second storages.

11. The method of outputting the data according to claim 7, wherein the determining the accumulation method and the accumulation destination of the output data determines, in the case where the function selected by the user from the function screen is the speed priority in outputting the output data from the output apparatus, an accumulation of the output data in a format that depends on the output apparatus as the accumulation method of the output data.

12. The method of outputting the data according to claim 7, wherein the determining the accumulation method and the accumulation destination of the output data determines, in the case where the function selected by the user from the function screen is a designation of the accumulation destination of the output data, the accumulation destination of the information relevant to the output data in response to the designation of the accumulation destination of the output data.

13. A terminal apparatus that communicates with an output apparatus and at least one information processing apparatus including a second storage, the terminal apparatus comprising:

a first storage;

a selection receipt unit that is implemented by a processor and displays a function selection screen enabling a user to select a function from among a plurality of functions in response to an output request of data to be output received from the user and causes the user to select the function;

a determination unit that is implemented by a processor and determines, in response to the function selected by the user, whether an accumulation destination of output data is the first storage or the second storage; and an accumulation control unit that is implemented by a processor and sends information relevant to the output data to the at least one information processing apparatus causes the determined accumulation destination to store the output data.

14. The terminal apparatus according to claim 13, further comprising:

a proxy output control unit that selects, in a case where the function selected by the user from the function screen is an proxy output that causes a proxy user to output the data to be output, the proxy user associated with the user and adds information of the proxy user to the information relevant to the output data, wherein the determination unit determines that the accumulation destination of the output data is the second storage.

15. The terminal apparatus according to claim 13, wherein the determination unit determines, in the case where the function selected by the user from the function screen is an accumulation of the output data in the terminal apparatus, that the accumulation destination of the output data is the first storage included in the terminal apparatus, a format of the accumulated output data not depending on the output apparatus.

16. The terminal apparatus according to claim 13, wherein the determination unit determines, in the case where the function selected by the user from the function screen is a designation of the output apparatus to which the output data is output, the output data is not accumulated in the first and second storages.

17. The terminal apparatus according to claim 13, wherein the determination unit determines, in the case where the function selected by the user from the function screen is the speed priority in outputting the output data from the output apparatus, an accumulation of the output data in a format that depends on the output apparatus as the accumulation method of the output data.

18. The terminal apparatus according to claim 13, wherein the determination unit determines, in the case where the function selected by the user from the function screen is a designation of the accumulation destination of the output data, the accumulation destination of the information relevant to the output data in response to the designation of the accumulation destination of the output data.

* * * * *